(12) United States Patent
Ramanathan et al.

(10) Patent No.: US 9,317,943 B2
(45) Date of Patent: Apr. 19, 2016

(54) INTERACTIVE INTERSECTION AREAS

(71) Applicant: Oracle International Corporation, Redwood Shores, CA (US)

(72) Inventors: Jairam Ramanathan, Waltham, MA (US); Prashant Singh, Lexington, MA (US); Hugh Zhang, Winchester, MA (US); Brendon Glazer, Everett, MA (US)

(73) Assignee: Oracle International Corporation, Redwood Shores, CA (US)

( * ) Notice: Subject to any disclaimer, the term of this patent is extended or adjusted under 35 U.S.C. 154(b) by 183 days.

(21) Appl. No.: 14/047,380

(22) Filed: Oct. 7, 2013

(65) Prior Publication Data

US 2015/0029215 A1      Jan. 29, 2015

Related U.S. Application Data

(60) Provisional application No. 61/859,392, filed on Jul. 29, 2013.

(51) Int. Cl.
*G06T 11/20* (2006.01)

(52) U.S. Cl.
CPC ..................................... *G06T 11/20* (2013.01)

(58) Field of Classification Search
CPC ..... G09G 5/393; G09G 5/14; G09G 2340/10; G09G 2340/125; G06T 11/203; G06T 11/40; G06T 11/60; G06T 15/30; H04N 5/44504
See application file for complete search history.

(56) References Cited

U.S. PATENT DOCUMENTS

| | | | |
|---|---|---|---|
| 5,428,716 A * | 6/1995 | Brokenshire et al. ......... 345/421 |
| 5,982,383 A * | 11/1999 | Kumar et al. .................. 345/440 |
| 6,172,682 B1 * | 1/2001 | Claiborne et al. ............. 345/441 |
| 6,760,638 B1 * | 7/2004 | Love et al. ...................... 700/98 |
| 7,423,655 B1 * | 9/2008 | Stephens ....................... 345/624 |
| 7,602,403 B2 * | 10/2009 | Hamburg ....................... 345/625 |
| 7,764,291 B1 * | 7/2010 | Wang et al. ................... 345/581 |
| 7,864,197 B2 * | 1/2011 | Brown .......................... 345/629 |
| 8,847,983 B1 * | 9/2014 | Ranganathan .......... G06T 11/60 345/594 |
| 2003/0025696 A1 * | 2/2003 | Mulgan ......................... 345/440 |
| 2008/0037858 A1 * | 2/2008 | Gallatin et al. ............... 382/144 |
| 2009/0055136 A1 * | 2/2009 | Ilies ................................. 703/1 |
| 2012/0098858 A1 * | 4/2012 | Wallace et al. ............... 345/629 |
| 2012/0229467 A1 | 9/2012 | Czerwinski et al. |
| 2014/0028708 A1 * | 1/2014 | DeLuca et al. ............... 345/629 |
| 2014/0240233 A1 * | 8/2014 | Jeong et al. .................. 345/163 |
| 2014/0297546 A1 * | 10/2014 | Birdwell et al. .............. 705/318 |

* cited by examiner

*Primary Examiner* — Todd Buttram
(74) *Attorney, Agent, or Firm* — Miles & Stockbridge P.C.

(57) ABSTRACT

A system that generates interactive intersection areas receives a graphic diagram that includes a plurality of intersecting shapes and intersection areas. The system then creates or receives a definition for each of the shapes and determines a number of possible intersection areas for the diagram. The system defines a clipping path for each possible intersection area and defines a mask for each possible intersection area. The system then draws each intersection area using the defined clipping paths and masks.

20 Claims, 3 Drawing Sheets

INTERACTIVE INTERSECTION AREAS

CROSS REFERENCE TO RELATED APPLICATIONS

This application claims priority of Provisional Patent Application Ser. No. 61/859,392, filed on Jul. 29, 2013, the contents of which is hereby incorporated by reference.

FIELD

One embodiment is directed generally to a computer system, and in particular to a computer system that provides interactive intersection areas.

BACKGROUND INFORMATION

Many computer graphic applications display the intersection of multiple shapes. For example, computer generated Venn and Euler diagrams are commonly used to visually represent the relationships between two or more sets of objects. Typically, these diagrams use coloring to distinguish between the different sets and their various intersections. However in most cases computer generated diagrams of multiple intersecting shapes are static (i.e., no interactive capabilities), especially when the number of intersecting shapes increase to the point where it is difficult to determine the boundaries of all areas created by intersections.

SUMMARY

One embodiment is a system that generates interactive intersection areas. The system receives a graphic diagram that includes a plurality of intersecting shapes and intersection areas. The system then creates or receives a definition for each of the shapes and determines a number of possible intersection areas for the diagram. The system defines a clipping path for each possible intersection area and defines a mask for each possible intersection area. The system then draws each intersection area using the defined clipping paths and masks.

DETAILED DESCRIPTION

One embodiment uses clipping/clip paths and masks to create interactive areas from the intersections of any number of arbitrarily complex areas, including Venn and Euler diagrams. Each area formed by an intersection can be recognized separately so that interactive features for each area can be enabled by allowing each separate area to be selectable.

The intersections of multiple shapes can be made interactive by exactly calculate the bounding paths of each intersection area. This is generally possible for a small number of simple shapes, but it becomes increasingly difficult if not impossible to calculate when there are more than a few shapes, or the shapes themselves are complex.

Figure 1A:
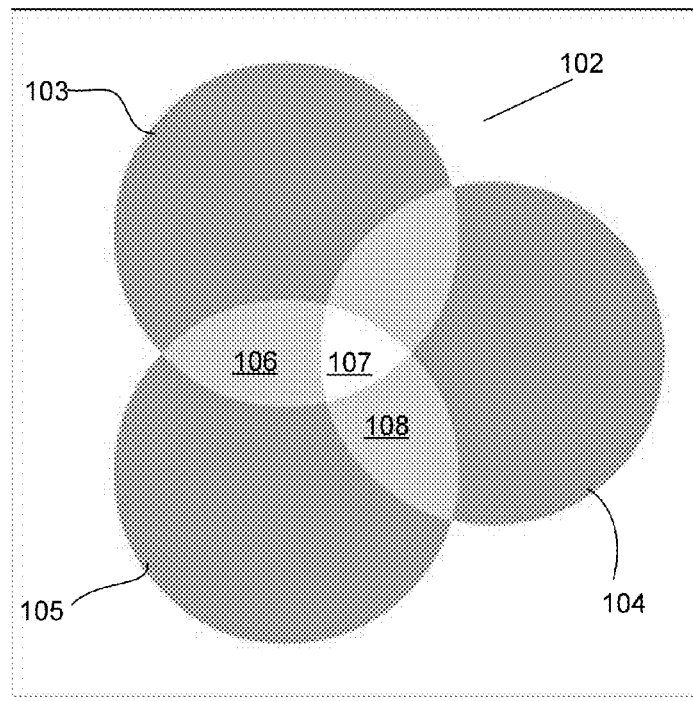
FIGS. 1a and 1b are example diagrams of multiple shapes forming multiple intersection areas in accordance with one embodiment.

For example, FIG. 1a illustrates a Venn diagram 102 of three symmetric circles 103, 104 and 105. For the simple cases of symmetric two- and three-circle Venn diagrams, such as Venn diagram 102, these diagrams can be made interactive by geometrically calculating the intersection points of the various circles and separately rendering each intersection area (e.g., intersection areas 106, 107, 108, etc.) by explicitly specifying the bounding paths.

Figure 1B:
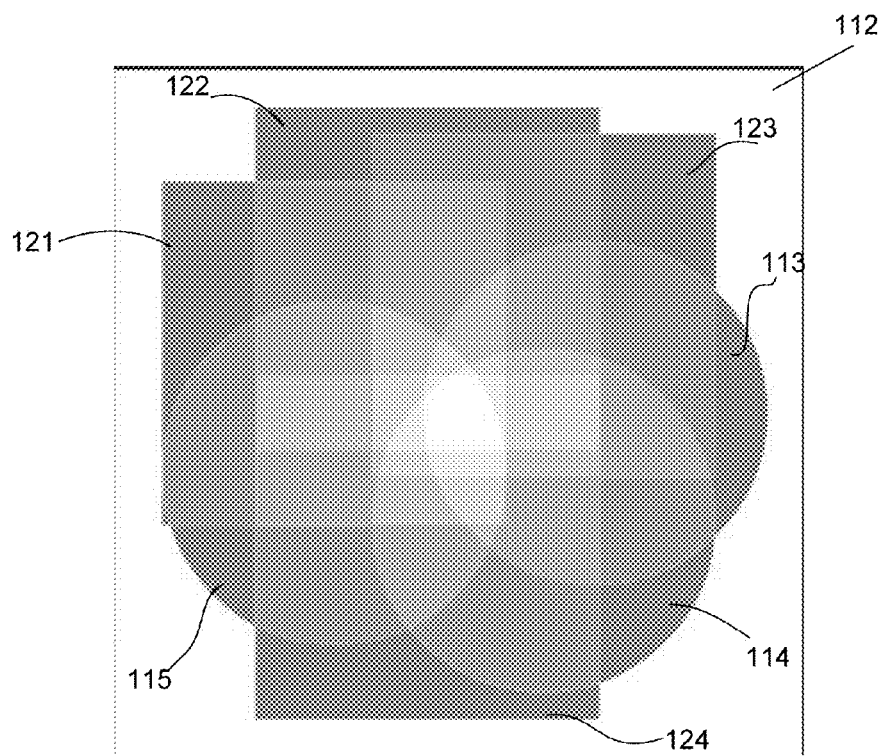

In contrast, FIG. 1b illustrates a seven shape diagram 112 that includes the intersections of three circles 113, 114 and 115 and four squares 121, 122, 123 and 124. For diagram 112, there are an enormous amount of intersection area boundaries that would need to be calculated. In general, the boundary calculation approach becomes cumbersome or impossible if any of the following are true: (a) the sets/shapes are different sizes; (b) there are more than three sets; or (c) the sets are represented by complex shapes. For proper Venn diagrams, if (b) is true, (c) must also be true because it is not possible to render a planar 4-set Venn diagram using circles. In any of these circumstances, boundary calculations are generally not possible and a user is typically left with a non-interactive diagram which is effective at summarizing the data, but limited for further analysis.

Instead of calculating the boundaries of each intersection area, embodiments use clipping paths and masks to create interactive regions from the intersections of any number of arbitrarily complex areas. Therefore, for example, embodiments can allow a user to interact with any area intersection of complex Venn diagrams rather than just being limited to a static rendering of the diagram. As an example, if a Venn diagram represents a dataset with five different relevant attributes, the user would be able to click on the region representing the intersection of attributes A, B, and C, but NOT D or E and potentially see further details about the data rows belonging to that intersection.

Figure 2:
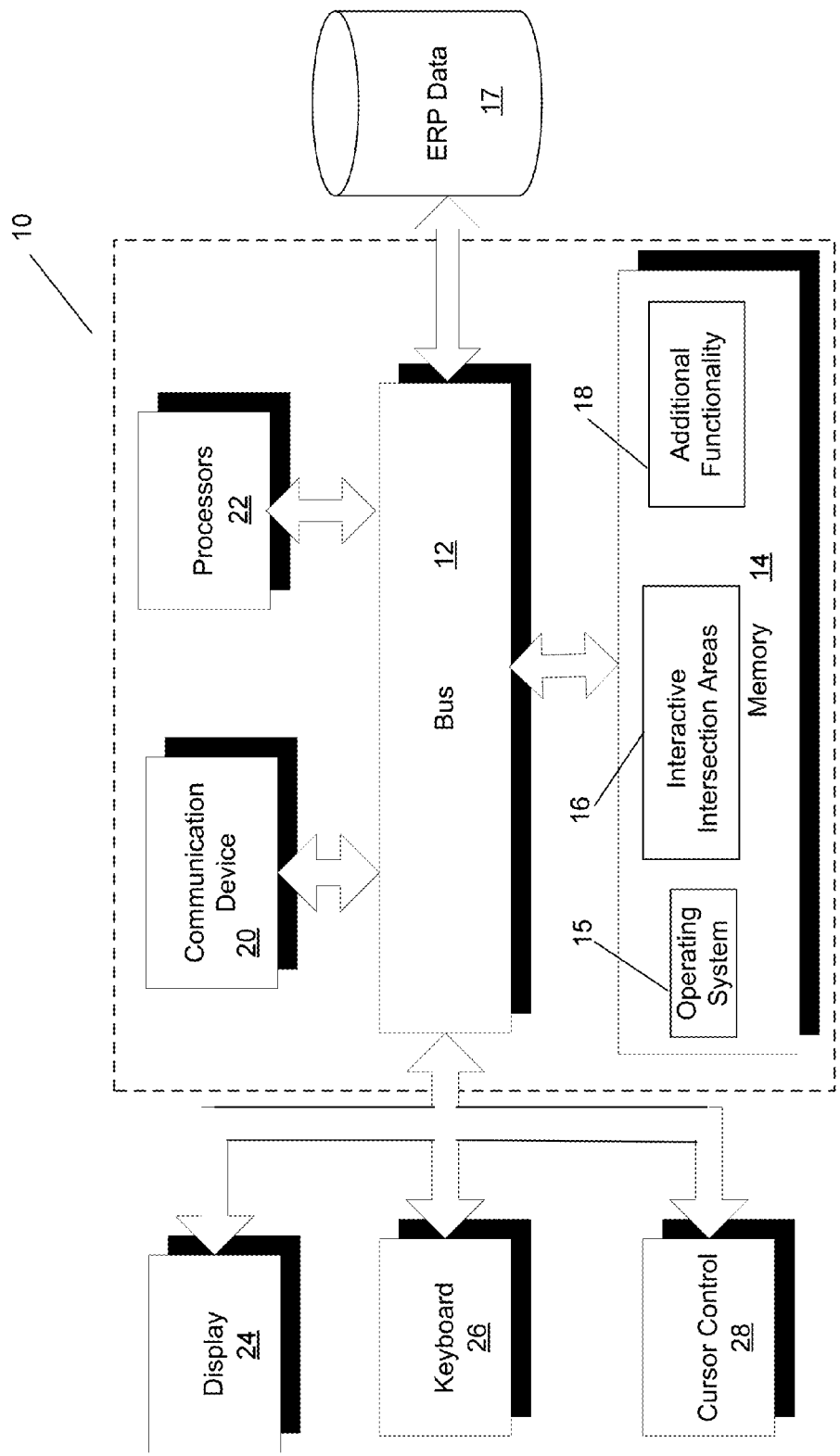
FIG. 2 is a block diagram of a computer server/system in accordance with an embodiment of the present invention.

FIG. 2 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a user client, system 10 may be a smartphone that includes a processor, memory and a display, but may not include one or more of the other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can beaccessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include an interactive intersection areas module 16 for providing interactive intersection areas from diagrams using clipping paths and masks, as disclosed in further detail below. System 10 can be part of a larger system, such as a business intelligence system that generates data provided in response to a user interacting with diagrams. Therefore, system 10 can include one or more additional functional modules 18 to include the additional functionality. A database 17 is coupled to bus 12 to provide centralized storage for modules 16 and 18.

In general, a clipping path allows a graphics display developer to render only the portion of an area that is contained within the clipping path. A clipping is a closed vector path, or shape, used to cut out a two-dimensional image in image editing software. Anything inside the path will be included after the clipping path is applied; anything outside the path will be omitted from the output. Applying the clipping path results in a hard (aliased) or soft (anti-aliased) edge, depending on the image editor's capabilities.

Similarly, masks or masking allow a developer to render every part of an area except those portions contained in the mask area. In computer graphics, when a given image is intended to be placed over a background, the transparent areas can be specified through a binary mask. Therefore, for each intended image there are actually two bitmaps: the actual image, in which the unused areas are given a pixel value with all bits set to 0's, and an additional mask, in which the corresponding image areas are given a pixel value of all bits set to 0s and the surrounding areas a value of all bits set to 1s.

Embodiments use clipping paths and masks together to render any arbitrarily complex intersection. For example, for a complex Venn diagram, the intersection of A, B, and C but NOT D or E can be displayed by rendering the shape of A with a clipping path that is the intersection of shapes B and C and with a mask that is the union of shapes D and E. The union of two shapes is obtained by including both shapes in a corresponding mask. The intersection of two shapes is obtained by chaining clipping paths together; for example to clipping A by the intersection of B and C, a developer can render B using C as a clipping path and then use the resulting shape as the clipping path for A.

Figure 3:
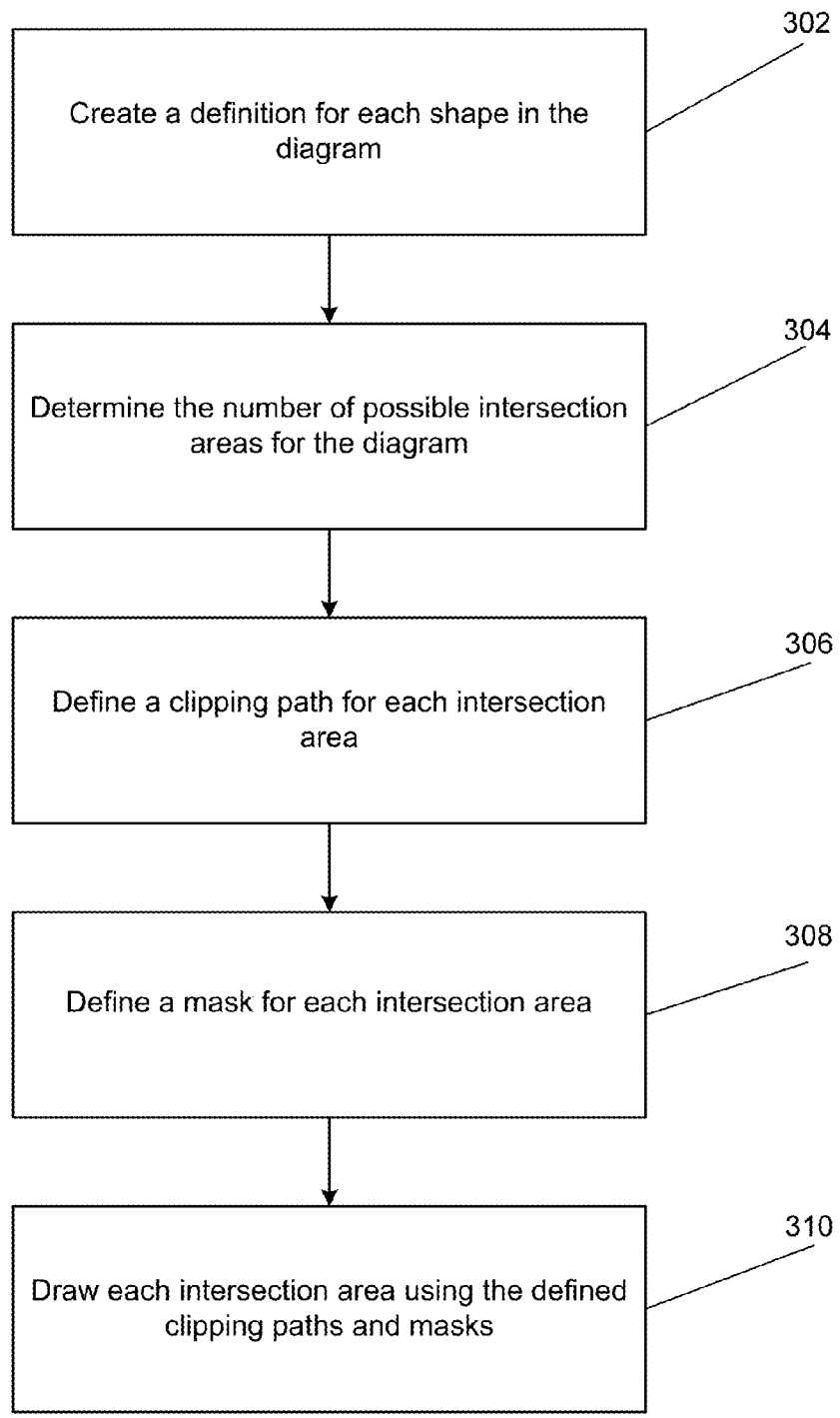
FIG. 3 is a flow diagram of the functionality of an interactive intersection areas module of FIG. 2 when providing interactive intersection areas from diagrams using clipping paths and masks in accordance with one embodiment.

FIG. 3 is a flow diagram of the functionality of interactive intersection areas module 16 of FIG. 2 when providing interactive intersection areas from graphic diagrams using clipping paths and masks in accordance with one embodiment. In one embodiment, the functionality of the flow diagram of FIG. 3, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, a definition for each shape in the diagram is created. For example, diagram 112 of FIG. 1b includes three circles 113, 114 and 115 and four squares 121, 122, 123 and 124. Each circle can be defined it terms of its radius, and each square can be defined by the length of each side. Other types of shapes are defined using known geometric characteristics. The definition can be created by receiving the definition from a table or any other source.

At 304, the number of possible intersection areas for the diagram is determined. For the number of shapes N, the number of possible intersection areas is $2^N-1$, which excludes the outer area that intersects none of the shapes.

At 306, for each intersection area a clipping path is defined. The clipping paths are defined by looping, for i=1 to $2^N$, using the set bits of the binary representation of i to determine which shapes to include in the clipping path. For example, for i=13, which has a binary representation of 1101, the clipping path should include shapes 0, 2 and 3 (the index is zero-based, starting from the right). The clipping path is defined using the shape of the highest set bit, and a sub clipping path is defined representing the remaining set bits. Since the value represented by the remaining set bits (in this case, the bits "101" corresponding to the value 5) is necessarily smaller than i, the sub clipping path will already have been defined earlier in the loop.

At 308, for each intersection area a mask is defined. The masks are defined by looping, for i=1 to $2^N$, using the unset bits of the binary representation of i to determine which shapes to exclude in the masks (i.e., which shapes to draw in black). For example, for i=13, which has a binary representation of 1101, the mask should exclude shape 1 (the index is zero-based, starting from the right). In order to mask a shape, in one embodiment a white rectangle which does not block anything is created, and then the shape is added using black pixels to mask out the shape.

At 310, each intersection area is drawn using the defined clipping paths and masks. The intersection areas are drawn by looping, for i=1 to $2^N$, using the set/unset bits of the binary representation of i to determine which shapes to draw, including a clipping and mask bit. For example, for i=13, which has a binary representation of 1101, shape 3 will be drawn (i.e., the highest set bit). Further, clipping path 5 will be used to clip by all of the set bits except the highest which is already drawn (e.g., 5 is binary 101). Mask 13 will be used to mask all of unset bits.

Once each intersection area is separately drawn, each intersection area can now be interactive as it can be determined, for example, which intersection area a cursor is located within when a selection indicator is received. Because each intersection area has been individually rendered at 310, independent event listeners can be attached to each area and therefore any desired interaction behavior can be implemented (e.g., on hover, click, etc.).

In one embodiment, the following pseudo code implements the functionality of interactive intersection areas module 16 for of FIG. 2 when providing interactive intersection areas from graphic diagrams using clipping paths and masks in accordance with one embodiment:

```
/ Pseudocode for drawing the area intersection for a list of arbitrary shapes
drawAreaIntersections( ) {
    // create a definition of each shape that can be reused for defining clipPaths,
    masks, and for rendering
    for (i = 0 to numberOfShapes − 1) {
        createShapeDefinition(i);
    }
```

```
// There are 2^numberOfShapes - 1 possible intersection areas (excluding the
outer area which intersects none of the shapes)
    // Need to define clipPaths and masks for each one
    // Define the clipPaths
    for (i = 1 to 2^numberOfShapes) {
        // use the binary representation of i to determine which shapes to include in the
clipPath
        // e.g. for 13, which is 1101, the clipPath should include shapes 0, 2, 3
(index is zero-based, starting from the right)
        shapeToUse = findHighestSetBit(i);
        remainingBits = removeBit(i, shapeToUse);
        // Define a clipPath using the shape of the highest set bit and a
subClipPath representing the remaining set bits
        // Since remainingBits is necessarily smaller than i, we will have already
defined this clipPath earlier in the loop
        createClipPath(shapeToUse, remainingBits);
    }
    // Define the masks
    for (i = 1 to 2^numberOfShapes) {
        // use the binary representation of i to determine which shapes to exclude in the
mask
        // e.g. for 13, which is 1101, the mask should exclude shapes 1 (index is
zero-based, starting from the right)
        createEmptyMask(i); // a white rectangle which doesn't block anything
        forEachUnsetBit(i) {
          mask[i].addShape(bit); // add shape in black to mask out the shape
        }
    }
    // Now draw each of the 2^numberOfShapes - 1 possible intersection areas using
the appropriate clipPaths and masks
    for (i = 1 to 2^numberOfShapes) {
        // use the binary representation of i to determine which shapes to draw, clip, and
mask
        // e.g. for 13, which is 1101, we will draw shape 3 (the highest set bit),
        // we will use clipPath 5 to clip by all of the set bits EXCEPT the highest
which is already drawn (5 is 101 in binary)
        // we will use mask 13 to mask all of the unset bits
        shapeToDraw = findHighestSetBit(i);
        remainingBits = removeBit(i, shapeToUse);
        drawShapeWithClipPathAndMask(shapeToDraw, remaining Bits, i);
    }
}
```

As disclosed, embodiments use clipping paths and masks to draw as a graphical display intersection areas formed from any number and types of shapes. As a result, the intersection areas are interactive for a user interfacing with the display.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to generate a graphical user interface with interactive intersection areas, the generating comprising:
   receiving code that defines a computerized graphic diagram comprising a plurality of intersecting shapes and intersection areas;
   creating a geometric definition for each of the shapes;
   determining a number of possible intersection areas for the defined computerized graphic diagram;
   defining a clipping path for each possible determined intersection area;
   defining a mask for each possible determined intersection area;
   drawing each intersection area as the graphical user interface using the defined clipping paths and masks;
   attaching an independent event listener to each intersection area;
   wherein the defined clipping paths and masks enable each intersection area to be separately recognizable and selectable when a user interacts with the graphical user interface, and the independent event listener implements a desired interaction behavior when each intersection area is selected;
   detecting a cursor within the graphical user interface; and
   determining which of the intersection areas the cursor is detected in based on the defined clipping paths and masks.

2. The computer-readable medium of claim 1, wherein the graphical user interface comprises an interactive Euler diagram.

3. The computer-readable medium of claim 1, wherein the graphical user interface comprises an interactive Venn diagram.

4. The computer-readable medium of claim 1, wherein the drawing comprises chaining the clipping paths together and including the shapes in the mask.

5. The computer-readable medium of claim 1, wherein the intersecting shapes comprise at least one of a circle with a corresponding geometric definition comprising a radius or a square with a corresponding geometric definition comprising a length of a side.

6. The computer-readable medium of claim 1, wherein the defining the clipping path for each possible intersection area comprises repeating, for each possible intersection area i, using set bits of a binary representation of i to determine which of the shapes to include in the clipping path.

7. The computer-readable medium of claim 1, wherein the defining the mask for each possible intersection area comprises repeating, for each possible intersection area i, using unset bits of a binary representation of i to determine which of the shapes to exclude in the masks.

8. A method for generating a graphical user interface with interactive intersection areas, the method comprising:
receiving by a processor, code that defines a computerized graphic diagram comprising a plurality of intersecting shapes and intersection areas;
creating by the processor a geometric definition for each of the shapes;
determining by a processor a number of possible intersection areas for the defined computerized graphic diagram;
defining a clipping path for each possible determined intersection area;
defining a mask for each possible determined intersection area;
drawing each intersection area as the graphical user interface using the defined clipping paths and masks;
attaching an independent event listener to each intersection area;
wherein the defined clipping paths and masks enable each intersection area to be separately recognizable and selectable when a user interacts with the graphical user interface, and the independent event listener implements a desired interaction behavior when each intersection area is selected;
detecting a cursor within the graphical user interface; and
determining which of the intersection areas the cursor is detected in based on the defined clipping paths and masks.

9. The method of claim 8, wherein the graphical user interface comprises an interactive Euler diagram.

10. The method of claim 8, wherein the graphical user interface comprises an interactive Venn diagram.

11. The method of claim 8, wherein the drawing comprises chaining the clipping paths together and including the shapes in the mask.

12. The method of claim 8, wherein the intersecting shapes comprise at least one of a circle with a corresponding geometric definition comprising a radius or a square with a corresponding geometric definition comprising a length of a side.

13. The method of claim 8, wherein the defining the clipping path for each possible intersection area comprises repeating, for each possible intersection area i, using set bits of a binary representation of i to determine which of the shapes to include in the clipping path.

14. The method of claim 8, wherein the defining the mask for each possible intersection area comprises repeating, for each possible intersection area i, using unset bits of a binary representation of i to determine which of the shapes to exclude in the masks.

15. An interactive intersection areas system comprising:
a definition module that receives code that defines a computerized graphic diagram comprising a plurality of intersecting shapes and intersection areas and creates a geometric definition for each of the shapes;
a determining module that determines a number of possible intersection areas for the defined computerized graphic diagram;
a clipping and masking module that defines a clipping path for each possible determined intersection area and defines a mask for each possible determined intersection area;
a drawing module that draws each intersection area as the graphical user interface using the defined clipping paths and masks and attaches an independent event listener to each intersection area;
wherein the defined clipping paths and masks enable each intersection area to be separately recognizable and selectable when a user interacts with the graphical user interface, and the independent event listener implements a desired interaction behavior when each intersection area is selected;
wherein the determining module further detects a cursor within the graphical user interface and determines which of the intersection areas the cursor is detected in based on the defined clipping paths and masks.

16. The system of claim 15, wherein the graphical user interface comprises an interactive Venn diagram.

17. The system of claim 15, wherein the drawing module chains the clipping paths together and includes the shapes in the mask.

18. The system of claim 15, wherein the intersecting shapes comprise at least one of a circle with a corresponding geometric definition comprising a radius or a square with a corresponding geometric definition comprising a length of a side.

19. The system of claim 15, wherein the clipping and masking module defines the clipping path for each possible intersection area by repeating, for each possible intersection area i, using set bits of a binary representation of i to determine which of the shapes to include in the clipping path.

20. The system of claim 15, wherein the clipping and masking module defines the mask for each possible intersection area by repeating, for each possible intersection area i, using unset bits of a binary representation of i to determine which of the shapes to exclude in the masks.

* * * * *